United States Patent
Kim et al.

(10) Patent No.: US 7,035,031 B2
(45) Date of Patent: Apr. 25, 2006

(54) INSTALLATION OF HEATER INTO HARD DISK DRIVE TO IMPROVE RELIABILITY AND PERFORMANCE AT LOW TEMPERATURE

(75) Inventors: Weonwoo Kim, Cupertino, CA (US); Hae Jung Lee, Santa Clara, CA (US); Sang Y. Lee, Pleasanton, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 404 days.

(21) Appl. No.: 10/001,846

(22) Filed: Nov. 26, 2001

(65) Prior Publication Data

US 2003/0099055 A1    May 29, 2003

(51) Int. Cl.
*G11B 19/02*    (2006.01)
*G11B 33/14*    (2006.01)

(52) U.S. Cl. ....................... 360/69; 360/97.02
(58) Field of Classification Search ............... 360/69, 360/75, 31, 66, 97.02, 97.03
See application file for complete search history.

(56) References Cited

U.S. PATENT DOCUMENTS

| | | | |
|---|---|---|---|
| 3,834,392 A | 9/1974 | Lampman et al. | |
| 4,343,300 A | 8/1982 | Hattori | |
| 4,499,895 A | 2/1985 | Takayama | |
| 4,572,198 A | 2/1986 | Condrington | |
| 4,573,452 A | 3/1986 | Greenberg | |
| 4,601,705 A | 7/1986 | McCoy | |
| 4,621,618 A | 11/1986 | Omagari | |
| 4,633,304 A | 12/1986 | Nagasaki | |
| 4,672,963 A | 6/1987 | Barken | |
| 4,758,222 A | 7/1988 | McCoy | |
| 4,785,806 A | 11/1988 | Deckelbaum | |
| 4,788,975 A | 12/1988 | Shturman et al. | |
| 4,790,813 A | 12/1988 | Kensey | |
| 4,831,476 A * | 5/1989 | Branc et al. ............. | 360/97.02 |
| 4,875,897 A | 10/1989 | Lee | |
| 4,887,605 A | 12/1989 | Angelsen et al. | |
| 4,974,607 A | 12/1990 | Miwa | |
| 4,996,975 A | 3/1991 | Nakamura | |
| 5,078,714 A | 1/1992 | Katims | |
| 5,104,392 A | 4/1992 | Kittrell et al. | |
| 5,125,888 A | 6/1992 | Howard et al. | |
| 5,203,781 A | 4/1993 | Bonati et al. | |
| 5,217,001 A | 6/1993 | Nakao et al. | |
| 5,217,003 A | 6/1993 | Wilk | |
| 5,217,453 A | 6/1993 | Wilk | |
| 5,228,429 A | 7/1993 | Hatano | |
| 5,233,482 A | 8/1993 | Galbraith et al. | |

(Continued)

FOREIGN PATENT DOCUMENTS

EP    0079524 A1    5/1983

*Primary Examiner*—Andrew L. Sniezek
(74) *Attorney, Agent, or Firm*—Ben J. Yorks; Jeffrey P. Aiello; Irell & Manella LLP

(57) ABSTRACT

A hard disk drive that includes a heater to heat an internal cavity of the drive. The disk drive may also have a temperature sensor to sense the temperature of the internal cavity, and a control circuit to control the heater and maintain the disk drive cavity, to be no less than a threshold temperature. The threshold temperature may correspond to a point where the heads of the drive undergo a significant degradation of performance. Maintaining the disk drive cavity temperature at or above the threshold temperature insures that the heads will not degrade due to temperature.

11 Claims, 2 Drawing Sheets

U.S. PATENT DOCUMENTS

| | | |
|---|---|---|
| 5,259,365 A | 11/1993 | Nishikori et al. |
| 5,301,080 A | 4/1994 | Ottesen et al. |
| 5,335,121 A | 8/1994 | Bombeeck |
| 5,367,409 A | 11/1994 | Ottesen et al. |
| 5,368,015 A | 11/1994 | Wilk |
| 5,388,127 A | 2/1995 | Scarpa |
| 5,497,111 A | 3/1996 | Cunningham |
| 5,566,101 A | 10/1996 | Kodra |
| 5,590,154 A | 12/1996 | Forni et al. |
| 5,781,133 A | 7/1998 | Tsang |
| 5,822,143 A | 10/1998 | Cloke et al. |
| 5,844,920 A | 12/1998 | Zook et al. |
| 5,862,007 A | 1/1999 | Pham et al. |
| 5,898,532 A | 4/1999 | Du et al. |
| 5,961,658 A | 10/1999 | Reed et al. |
| 6,094,316 A | 7/2000 | Pham et al. |
| 6,574,061 B1 * | 6/2003 | Ling et al. .............. 360/66 |
| 6,735,035 B1 * | 5/2004 | Smith et al. ............. 360/69 |

\* cited by examiner

INSTALLATION OF HEATER INTO HARD DISK DRIVE TO IMPROVE RELIABILITY AND PERFORMANCE AT LOW TEMPERATURE

BACKGROUND OF THE INVENTION

1. Field of the Invention

The present invention relates to a heater for heating the enclosed area of a hard disk drive.

2. Background Information

Hard disk drives contain a plurality of magnetic heads that are coupled to rotating disks. The heads write and read information by magnetizing and sensing the magnetic fields of the disk surfaces. There have been developed magnetic heads that have a write element for magnetizing the disks and a separate read element for sensing the magnetic fields of the disks. The read element is typically constructed from a magneto-resistive material. The magneto-resistive material has a resistance that varies with the magnetic fields of the disk. Heads with magneto-resistive read elements are commonly referred to as magneto-resistive (MR) heads.

Each head is attached to a suspension arm to create an subassembly commonly referred to as a head gimbal assembly ("HGA"). The HGA's are attached to an actuator arm which has a voice coil motor that can move the heads across the surfaces of the disks.

Each head has an air bearing surface that cooperates with an air flow generated by the rotating disk to create an air bearing. The air bearing prevents mechanical wear between the head and the disk.

The MR heads are typically constructed from a material that is sensitive to temperature. Most commercially available MR heads undergo a significant degradation of performance when the head temperature falls below a threshold value. This head degradation may increase the bit error rate of the disk drive to an unacceptable level.

BRIEF SUMMARY OF THE INVENTION

A hard disk drive that includes a heater to heat an internal cavity of the drive. The disk drive may also have a temperature sensor to sense the temperature of the internal cavity, and a control circuit to control the heater and maintain the disk drive cavity to be no less than a threshold temperature.

DETAILED DESCRIPTION OF THE PREFERRED EMBODIMENT

A hard disk drive that includes a heater to heat an internal cavity of the drive. The disk drive may also have a temperature sensor to sense the temperature of the internal cavity, and a control circuit to control the heater and maintain the disk drive cavity to be no less than a threshold temperature. The threshold temperature may correspond to a point where the heads of the drive undergo a significant degradation of performance. By way of example the threshold temperature may be approximately 10–15 centigrade (° C.). Maintaining the disk drive cavity temperature at or above the threshold temperature insures that the heads will not degrade due to temperature.

Figure 1:
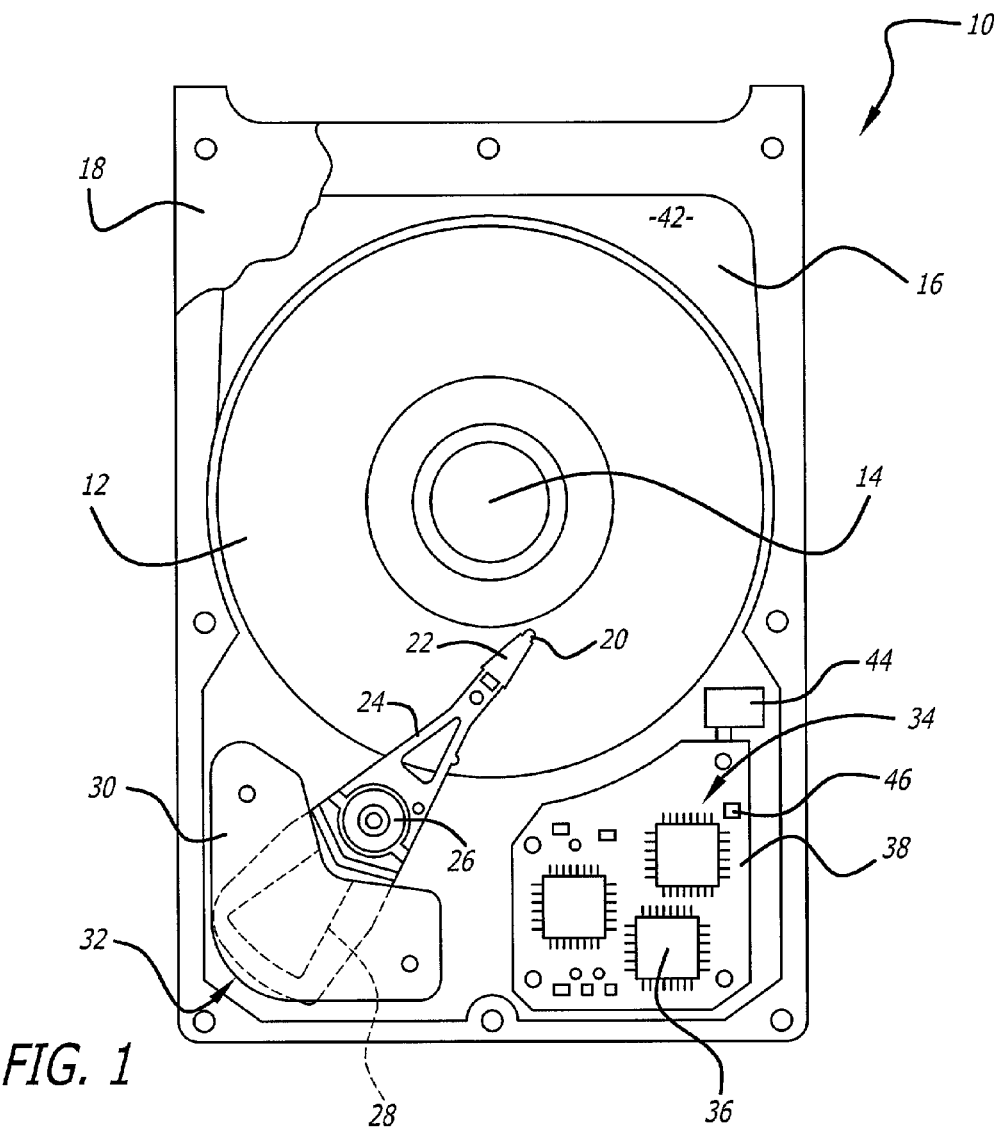
FIG. 1 is a top view of an embodiment of a hard disk drive.

Referring to the drawings more particularly by reference numbers, FIG. 1 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements (not shown) that magnetize and sense the magnetic fields of the disks 12.

Each head 20 may be gimbal mounted to a suspension arm 22 as part of a head gimbal assembly (HGA). The suspension arms 22 are attached to an actuator arm 24 that is pivotally mounted to the base plate 16 by a bearing assembly 26. A voice coil 28 is attached to the actuator arm 24. The voice coil 28 is coupled to a magnet assembly 30 to create a voice coil motor (VCM) 32. Providing a current to the voice coil 28 will create a torque that swings the actuator arm 24 and moves the heads 20 across the disks 12.

The hard disk drive 10 may include a printed circuit board assembly 34 that includes a plurality of integrated circuits 36 coupled to a printed circuit board 38. The printed circuit board 38 is coupled to the voice coil 28, heads 20 and spindle motor 14 by wires (not shown).

The disks 12, heads 20 and voice coil motor 32 may be located within an internal cavity 42 of the disk drive 10 located between the base plate 16 and the cover 18. The disk drive 10 includes a heater 44 that can provide heat to the cavity 42 to control the cavity temperature. The heater 44 may be a resistive element that is coupled to the printed circuit board assembly 34.

Although one heater 44 is shown, it is to be understood that multiple heater 44 elements may be integrated into the disk drive 10. The heater 44 may provide heat to maintain the temperature of the cavity 42 above a threshold value. The threshold value is typically the temperature at which the heads 20 will create a higher bit error rate in the disk drive. Maintaining the cavity temperature, and corresponding head temperatures, above the threshold value will reduce the probability of bit errors due to temperature variations in the drive 10.

The disk drive 10 may also have a temperature sensor 46 that can sense the temperature of the cavity 42. The temperature sensor 46 may be integrated into the printed circuit board assembly 36, although it is to be understood that the sensor 46 may be located at other points within the drive 10. Additionally, the disk drive 10 may have multiple temperature sensors (not shown).

Figure 2:
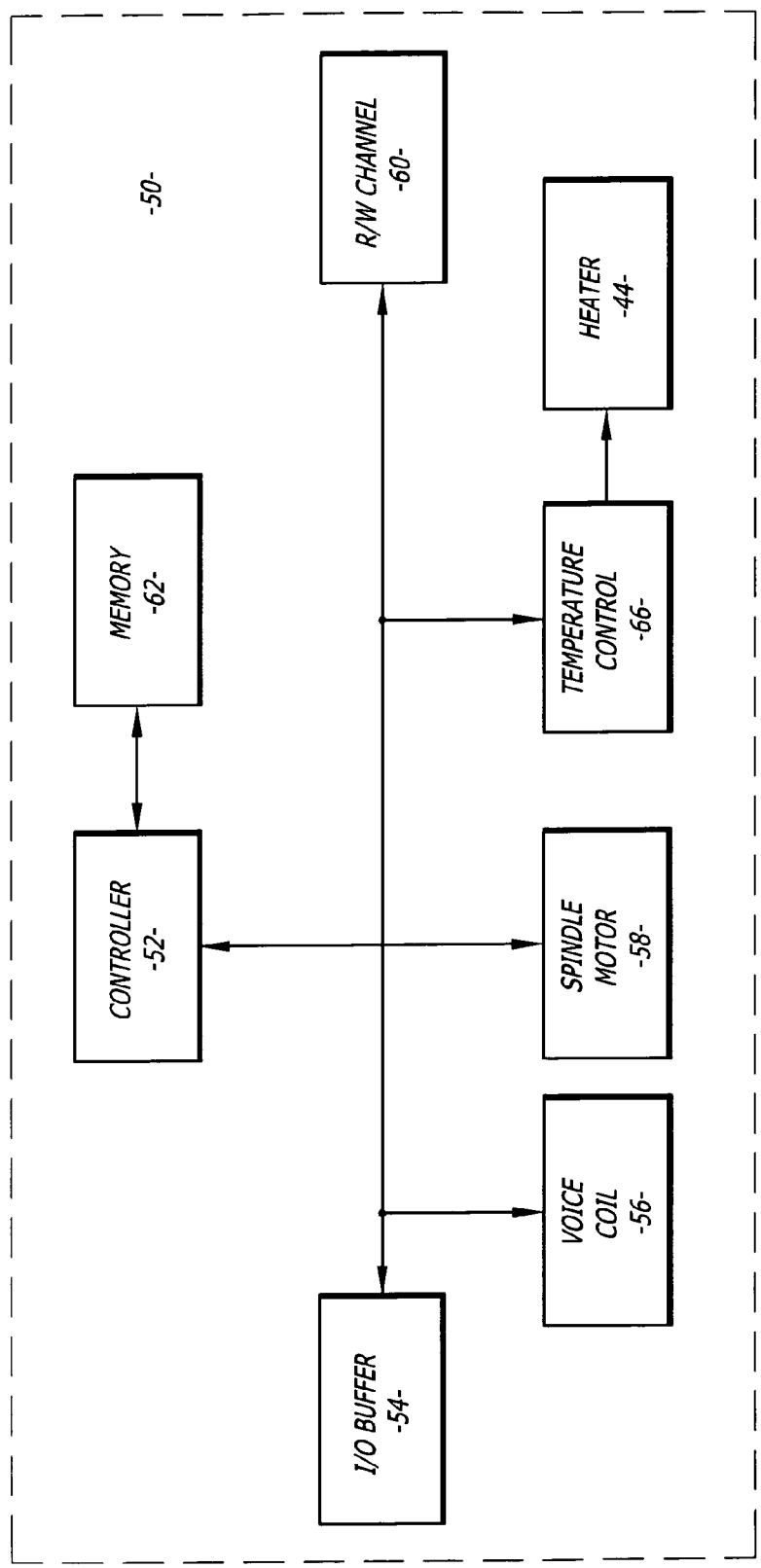
FIG. 2 is a schematic of an electrical system of the hard disk drive.

FIG. 2 shows a schematic of an electrical system 50 that can control the disk drive 10. The electrical system 50 may be integrated into the printed circuit board assembly 36 shown in FIG. 1. The system 50 includes a controller 52 that is connected to an input/output (I/O) buffer 54, voice coil motor control circuit 56, spindle motor control circuit 58, read/write channel circuit 60, memory 62. The I/O buffer 54 provides an interface with an external source such as a personal computer. The voice coil control circuit 56 and spindle motor control circuit 58 contain drivers, etc. to control the voice coil motor and spindle motor, respectively.

The voice coil motor circuit 56 and spindle motor control circuit 58 operate in accordance with signals, commands, etc. from the controller 52. The controller 52 may be a processor that can perform software routines in accordance with instructions and data to operate the storage and retrieval of information from the disks 12.

The drive 10 also has a temperature control circuit 66 that controls the heater 44.

Figure 3:
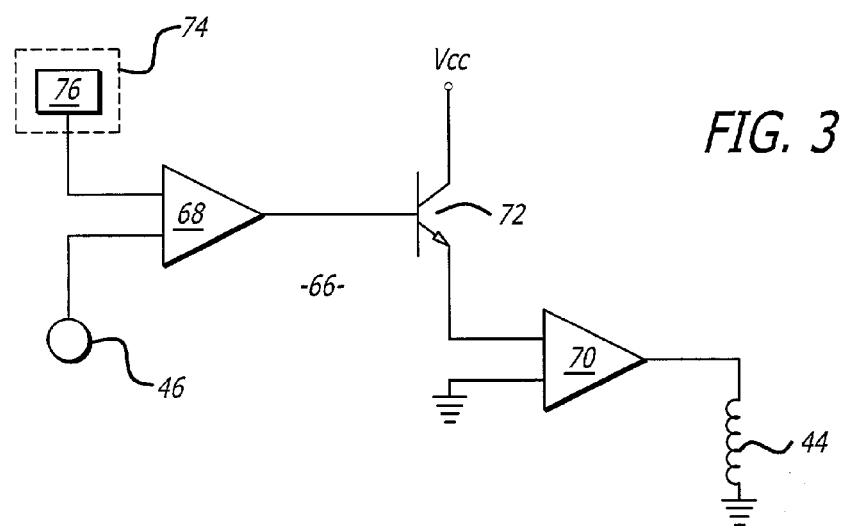
FIG. 3 is a schematic of a temperature sensor circuit of the electrical system.

FIG. 3 shows an embodiment of a control circuit 66. The control circuit 66 may include a comparator 68 that is coupled to an amplifier 70 by a switch 72. The switch 72 may be a bi-polar transistor (BJT), or a field effect transistor (FET). The amplifier 70 provides power to the heater 44. To reduce the cost of implementing the control circuit 66, the amplifier 70 may be integrated into the pre-amplifier (not shown) used to drive the heads 20.

The comparator 68 may have input terminals coupled to the temperature sensor 46 and a threshold circuit 74. The threshold circuit 74 provides the threshold value which corresponds to the critical temperature of the heads 20. The threshold circuit 74 may include a register 76 or other storage means to store the threshold value. The register would allow the threshold value to be varied through software. The threshold circuit 74 may include a digital to analog converter (not shown), or other appropriate circuitry to convert the stored digital value into an analog signal provided to the comparator 68. Alternatively, the threshold circuit 74 may be a simple fixed or variable resistor that establishes a voltage at the input of the comparator 68.

In operation, the comparator 68 provides a low output to the switch 72 when the output of the temperature sensor 46 is equal to or greater than the voltage provided by the threshold circuit 74. When the sensor output signal is less than the threshold signal the comparator 68 provides a high output. The high output signal turns the switch 72 on to activate the heater 44 through the amplifier 70. The heater 44 heats the disk drive cavity until the sensor signal again equals or exceeds the threshold voltage, wherein the comparator 68 switches off the switch 72 and deactivates the heater 44.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
    a base plate;
    a spindle motor coupled to said base plate;
    a disk coupled to said spindle motor;
    an actuator arm mounted to said base plate;
    a voice coil motor coupled to said actuator arm;
    a head coupled to said actuator arm;
    a cover plate attached to said base plate to create an internal cavity that contains said head;
    a heater located within said internal cavity;
    a temperature sensor that can sense a temperature of said internal cavity; and,
    a control circuit to control said heater to maintain a temperature of internal cavity to be no less than a threshold temperature, said control circuit includes an amplifier coupled to said heater and a comparator coupled to said amplifier and said temperature sensor.

2. The hard disk drive of claim 1, wherein said heater is coupled to said base plate.

3. The hard disk drive of claim 1, wherein said control circuit includes a switch coupled to said comparator and said amplifier.

4. The hard disk drive of claim 1, wherein the threshold temperature is approximately 10–15° C.

5. The hard disk drive of claim 1, further comprising a register that stores the threshold value.

6. A hard disk drive, comprising:
    a base plate;
    a spindle motor coupled to said base plate;
    a disk coupled to said spindle motor;
    an actuator arm mounted to said base plate;
    a voice coil motor coupled to said actuator arm;
    a head coupled to said actuator arm and said disk;
    a cover plate attached to said base plate to create an internal cavity that contains said head;
    heater means for heating said internal cavity;
    temperature sensor means for sensing a temperature of said internal cavity; and,
    control circuit means for controlling said heater to maintain a temperature of said internal cavity to be no less than a threshold temperature.

7. The hard disk drive of claim 6, wherein said control circuit means includes an amplifier coupled to said heater and a comparator coupled to said amplifier and said temperature sensor means.

8. The hard disk drive of claim 7, wherein said control circuit means includes a switch coupled to said comparator and said amplifier.

9. The hard disk drive of claim 6, wherein said heater means is coupled to said base plate.

10. The hard disk drive of claim 6, wherein the threshold temperature is approximately 10–15° C.

11. The hard disk drive of claim 6, wherein said control circuit means includes a register that stores the threshold value.

* * * * *